US008133574B2

(12) United States Patent
Derimiggio

(10) Patent No.: US 8,133,574 B2
(45) Date of Patent: Mar. 13, 2012

(54) VARYING FLUOROELASTOMER CURE ACROSS THE ROLLER TO MAXIMIZE FUSER ROLLER LIFE

(75) Inventor: John E. Derimiggio, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 991 days.

(21) Appl. No.: 12/050,668

(22) Filed: Mar. 18, 2008

(65) Prior Publication Data

US 2009/0239016 A1 Sep. 24, 2009

(51) Int. Cl.

| | |
|---|---|
| ***B32B 25/14*** | (2006.01) |
| ***B32B 33/00*** | (2006.01) |
| ***G03G 15/20*** | (2006.01) |

(52) U.S. Cl. ......................... 428/192; 428/421; 399/333

(58) Field of Classification Search ........................ None
See application file for complete search history.

(56) References Cited

U.S. PATENT DOCUMENTS

| | | | | |
|---|---|---|---|---|
| 3,857,807 | A * | 12/1974 | Kometani et al. | 524/92 |
| 5,019,869 | A * | 5/1991 | Patton | 399/320 |
| 5,666,592 | A * | 9/1997 | Aslam et al. | 399/67 |
| 6,042,695 | A * | 3/2000 | Ishino | 162/358.4 |
| 2001/0021437 | A1* | 9/2001 | Sakuma et al. | 428/167 |
| 2002/0136573 | A1* | 9/2002 | Ogren et al. | 399/333 |

* cited by examiner

*Primary Examiner* — Ramsey Zacharia
(74) *Attorney, Agent, or Firm* — MH2 Technology Law Group LLP

(57) ABSTRACT

In accordance with the invention, there are image forming apparatus, fuser members, and methods of making fuser members. The method of making a fuser member can include providing a substrate having a longitudinal axis, providing a first flow coating solution including a fluoroelastomer polymer, and providing a second flow coating solution including a crosslinking agent. The method can also include mixing the first flow coating solution and the second flow coating solution to form a third flow coating solution and forming a continuous fluoroelastomer layer over a surface of the substrate by applying the third flow coating solution onto the substrate in a spiral pattern, wherein the crosslinking agent concentration can be varied along the longitudinal axis by changing the ratio of the first flow coating solution and the second flow coating solution in the third flow coating solution.

8 Claims, 6 Drawing Sheets

VARYING FLUOROELASTOMER CURE ACROSS THE ROLLER TO MAXIMIZE FUSER ROLLER LIFE

DESCRIPTION OF THE INVENTION

1. Field of the Invention

The present invention relates to image forming apparatus and fuser members and, more particularly, to methods of making fuser members.

2. Background of the Invention

In electrostatographic fixing systems, fuser members are coated with a non-adhesive coating including fluoroelastomer polymer to overcome toner staining, i.e. the adhesion of the heat softened toner particles onto the surface of the fuser member. It is well known that the performance of the fuser members is dependent on the crosslink density of the fluoroelastomer polymer topcoat of the fuser member. Unfortunately, there is no single value of crosslink density that can maximize the performance of all the key characteristics simultaneously. For instance, it is known that the coating toughness increases if the crosslink density is decreased. This increased toughness improves wear performance. However, the fluoroelastomer polymer topcoat is more susceptible to toner staining and contamination at these lower crosslink density levels. Thus, there is a conflict on how to select the nominal crosslink density of the topcoat.

Accordingly, there is a need to overcome these and other problems of prior art to provide fuser members with optimized crosslink density and methods of making them.

SUMMARY OF THE INVENTION

In accordance with various embodiments, there is a fuser member including a substrate having a first edge and a second edge and a continuous fluoroelastomer layer disposed over a surface of the substrate The continuous fluoroelastomer layer can include a first region having a first crosslink density and at least a second region having a second crosslink density, wherein the first region can be disposed at an interior portion relative to the first and second edges of the substrate and the at least second region can be disposed proximate to the first region.

According to various embodiments, there is a method of making a fuser member. The method can include providing a substrate having a longitudinal axis, providing a first flow coating solution including a fluoroelastomer polymer, and providing a second flow coating solution including a crosslinking agent. The method can also include mixing the first flow coating solution and the second flow coating solution to form a third flow coating solution. The method can further include forming a continuous fluoroelastomer layer over a surface of the substrate by applying the third flow coating solution onto the substrate from an applicator in a spiral pattern by rotating the substrate in a horizontal position about the longitudinal axis and moving the applicator along the longitudinal axis, wherein the crosslinking agent concentration can be varied along the longitudinal axis by changing the ratio of the first flow coating solution and the second flow coating solution in the third flow coating solution.

According to another embodiment, there is an image forming apparatus including a receptor to receive an electrostatic latent image, at least one charging component for uniformly charging the receptor, at least one imaging component to form a latent image on the receptor, and at least one development component for converting the latent image to a visible image on the receptor. The image forming apparatus can also include a transfer component for transferring the visible image onto a media and a fuser member for fusing the visible image onto the media. The fuser member can include a substrate having a first edge and a second edge and a continuous fluoroelastomer layer disposed over a surface of the substrate, the continuous fluoroelastomer layer including a first region having a first crosslink density and at least a second region having a second crosslink density, wherein the first region can be disposed at an interior portion relative to the first and second edges of the substrate and the at least second region can be disposed proximate to the first region.

According to yet another embodiment, there is a method of making a fuser member. The method can include providing a substrate having a longitudinal axis, providing a first flow coating solution including a fluoroelastomer polymer and a first amount of a crosslinking agent, and providing a second flow coating solution including the fluoroelastomer polymer and a second amount of the crosslinking agent. The method can also include mixing the first flow coating solution and the second flow coating solution to form a third flow coating solution. The method can further include forming a continuous fluoroelastomer layer over a surface of the substrate by applying the third flow coating solution onto the substrate from an applicator in a spiral pattern by rotating the substrate in a horizontal position about the longitudinal axis and moving the applicator along the longitudinal axis, wherein the crosslinking agent concentration can be varied along the longitudinal axis by changing the ratio of the first flow coating solution and the second flow coating solution in the third flow coating solution.

Additional advantages of the embodiments will be set forth in part in the description which follows, and in part will be obvious from the description, or may be learned by practice of the invention. The advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

As used herein, the term "fuser member" is used interchangeably with the terms including fuser rolls, fuser belts, and fuser films.

Figure 1A:
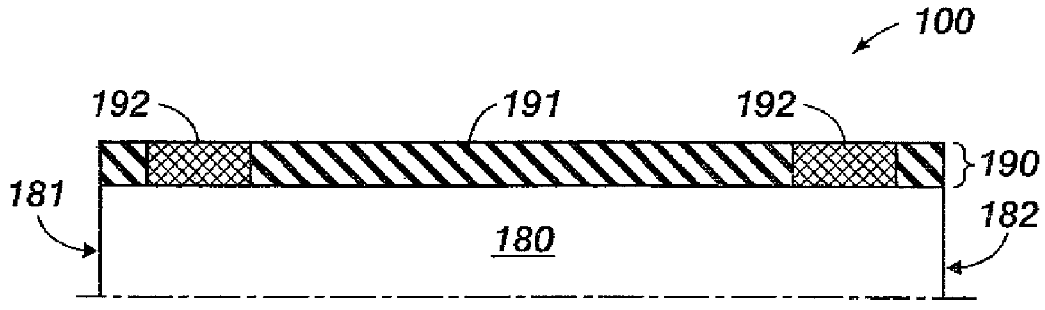
FIG. 1A schematically illustrates a cross sectional view of an exemplary fuser member, according to various embodiments of the present teachings.

FIG. 1A schematically illustrates a cross sectional view of an exemplary fuser member 100, according to various embodiments of the present teachings. The fuser member 100 can include a substrate 180 having a first edge 181 and a second edge 182 and a continuous fluoroelastomer layer 190 disposed over a surface of the substrate 180. In various embodiments, the continuous fluoroelastomer layer 180 can include a first region 190 having a first crosslink density and at least a second region 192 having a second crosslink density, wherein the first region 191 can be disposed at an interior portion relative to the first 181 edge and second edge 182 of the substrate 180 and the at least second region 192 can be disposed proximate to the first region 191. In some embodiments, the first region 191 can include a stain resistant region having the first crosslink density and the at least second region 192 can include one or more wear resistant regions having the second crosslink density lower than the first crosslink density. In some embodiments, at least one of the one or more wear resistant regions can be disposed at a position to reduce wear from edges of a media. In other embodiments, there can be a gradual increase in the crosslink density going from the second region 192 to the first region 191. In certain embodiments, there can be an abrupt change in the crosslink density going from the second region 192 to the first region 191. Yet, in some other embodiments, there can be one or more regions (not shown) between the first region 191 and the second region 192, wherein each of the one or more regions (not shown) can have a crosslink density different from the first crosslink density and the second crosslink density. In some embodiments, the crosslinking agent to fluoroelastomer polymer ratio can be from about 0.03 to about 0.04 in the wear resistance region after curing. In other embodiments, the crosslinking agent to fluoroelastomer polymer ratio can from about 0.09 to about 0.1 in the stain resistant region after curing.

In various embodiments, the continuous fluoroelastomer layer 190 can include fluoroelastomer polymer selected from the group consisting of copolymers of vinylidene fluoride, hexafluoropropylene, and tetrafluorothylene; and terpolymers of vinylidene fluoride, hexafluoropropylene, and tetrafluorothylene. Other suitable polymers are described in detail in the U.S. Pat. No. 5,945,223, the disclosure of which is incorporated herein in its entirety.

Any suitable material that has satisfactory heat transfer characteristics can be used as the substrate 180 for the fuser member 100. The fuser member 100 can be a roll, belt, flat surface or other suitable shape used in the fixing of thermoplastic toner images to a suitable media. The fuser member 100 can be a pressure member or a release agent donor member, preferably in the form of a cylindrical roll, belt, or film. Typically, the roll fuser member can be made of a hollow cylindrical metal core, such as copper, aluminum, steel, or certain plastic materials chosen to maintain rigidity, structural integrity, as well as being capable of having a fluoroelastomer coated thereon and adhered firmly thereto.

Figure 1B:
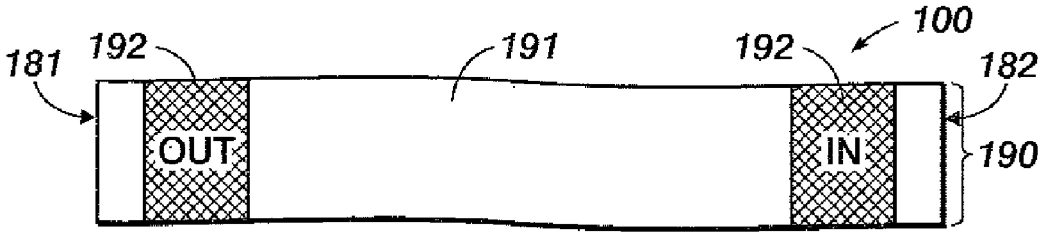
FIG. 1B schematically illustrates a top view of the exemplary fuser member shown in FIG. 1A, according to various embodiments of the present teachings.
Figure 3:
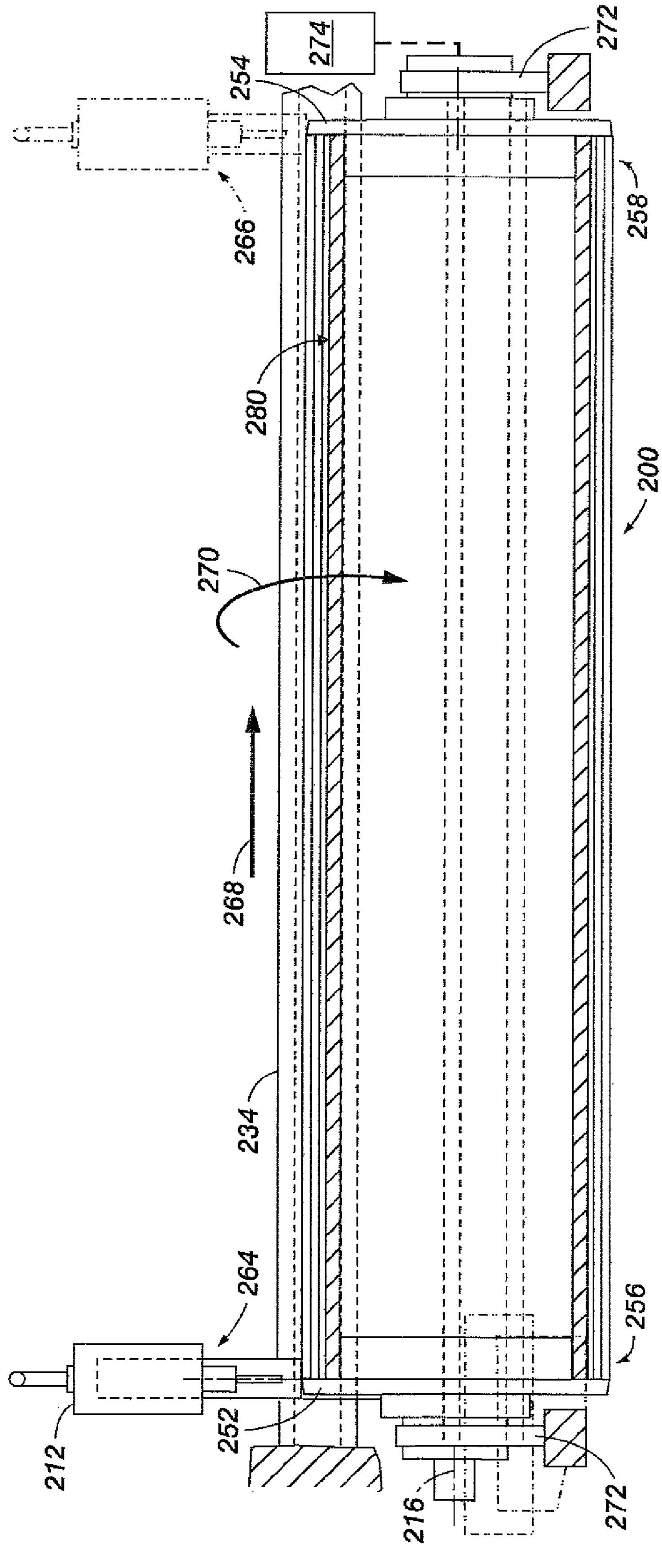
FIG. 3 is a sectional view of the flow coated fuser member being prepared on a turning apparatus shown in FIG. 2, according to various embodiments of the present teachings.
Figure 4:
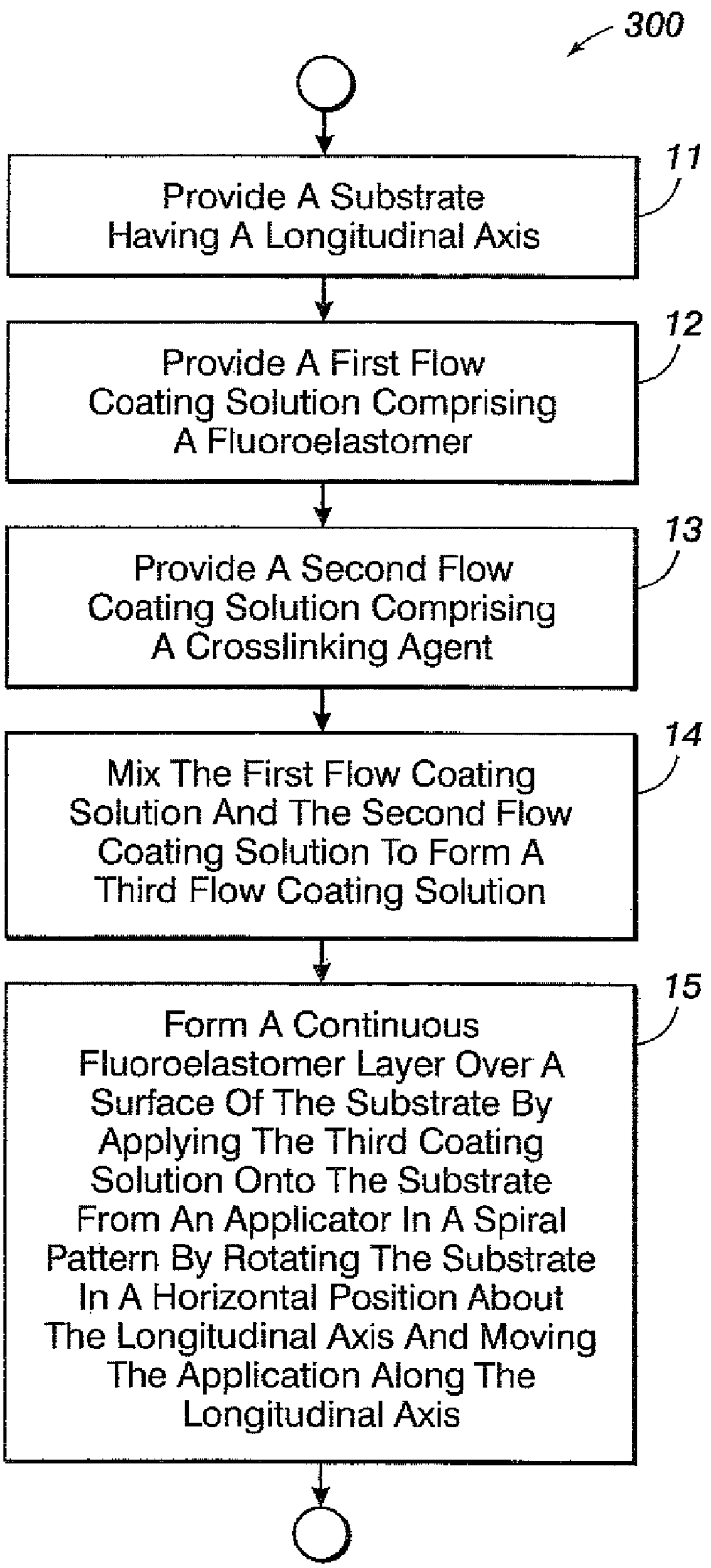
FIG. 4 shows a method of making a fuser member, according to various embodiments of the present teachings.

According to various embodiments, there is a method 300 of making a fuser member 100, 200 as shown in FIG. 4. In various embodiments, an apparatus 201, schematically illustrated in FIGS. 2 and 3 can be used to make the fuser member 100, 200. The method 300 can include providing a substrate 180 having a longitudinal axis 216 as in step 11, providing a first flow coating solution 202 including a fluoroelastomer polymer as in step 12, providing a second flow coating solution 202' including a crosslinking agent as in step 13, and mixing the first flow coating solution 202 and the second flow coating solution 202' to form a third flow coating solution 202", as in step 14. In some embodiments, the first flow coating solution 202 can include a fluoroelastomer polymer selected from the group consisting of copolymers of vinylidene fluoride, hexafluoropropylene, and tetrafluorothylene; and terpolymers of vinylidene fluoride, hexafluoropropylene, and tetrafluorothylene. In other embodiments, the second flow coating solution 202' can include a crosslinking agent, such as, for example, a bisphenol and a quarternary phosphonium salt. One of ordinary skill in the art would know that other suitable fluoroelastomer polymers and crosslinking agents can be used. In various embodiments, other suitable additives including, but not limited to metal oxides selected from the group consisting of magnesium oxide, cupric oxide, aluminum oxide, and mixtures thereof can be added to one or more of the first coating solution 202, the second coating solution 202', and the third coating solution 202". The method 300 can further include step 15 of forming a continuous fluoroelastomer layer 190 over a surface of the substrate 180 by applying the third flow coating solution 202" onto the substrate 280 from an applicator 212 in a spiral pattern by rotating the substrate 280 in a horizontal position about the longitudinal axis 216 and moving the applicator 212 along the longitudinal axis 212, wherein the crosslinking agent concentration can be varied along the longitudinal axis 216 by changing the ratio of the first flow coating solution 202 and the second flow coating solution 202' in the third flow coating solution 202". In various embodiments, the step 15 of forming a continuous fluoroelastomer layer 190 over a surface of the substrate 180, 280 can include forming a stain resistance region 191 and forming one or more wear resistance regions 192, as shown in FIGS. 1A and 1B. In some embodiments, the method 300 can also include curing the continuous fluoroelastomer layer 190, such that the crosslinking agent to fluoroelastomer polymer ratio can be from about 0.03 to about 0.04 in the wear resistance region 192 after curing. In other embodiments, the method 300 can further include curing the continuous fluoroelastomer layer 190, such that the crosslinking agent to fluoroelastomer polymer ratio is from about 0.09 to about 0.1 in the stain resistant 191 region after curing.

Figure 2:
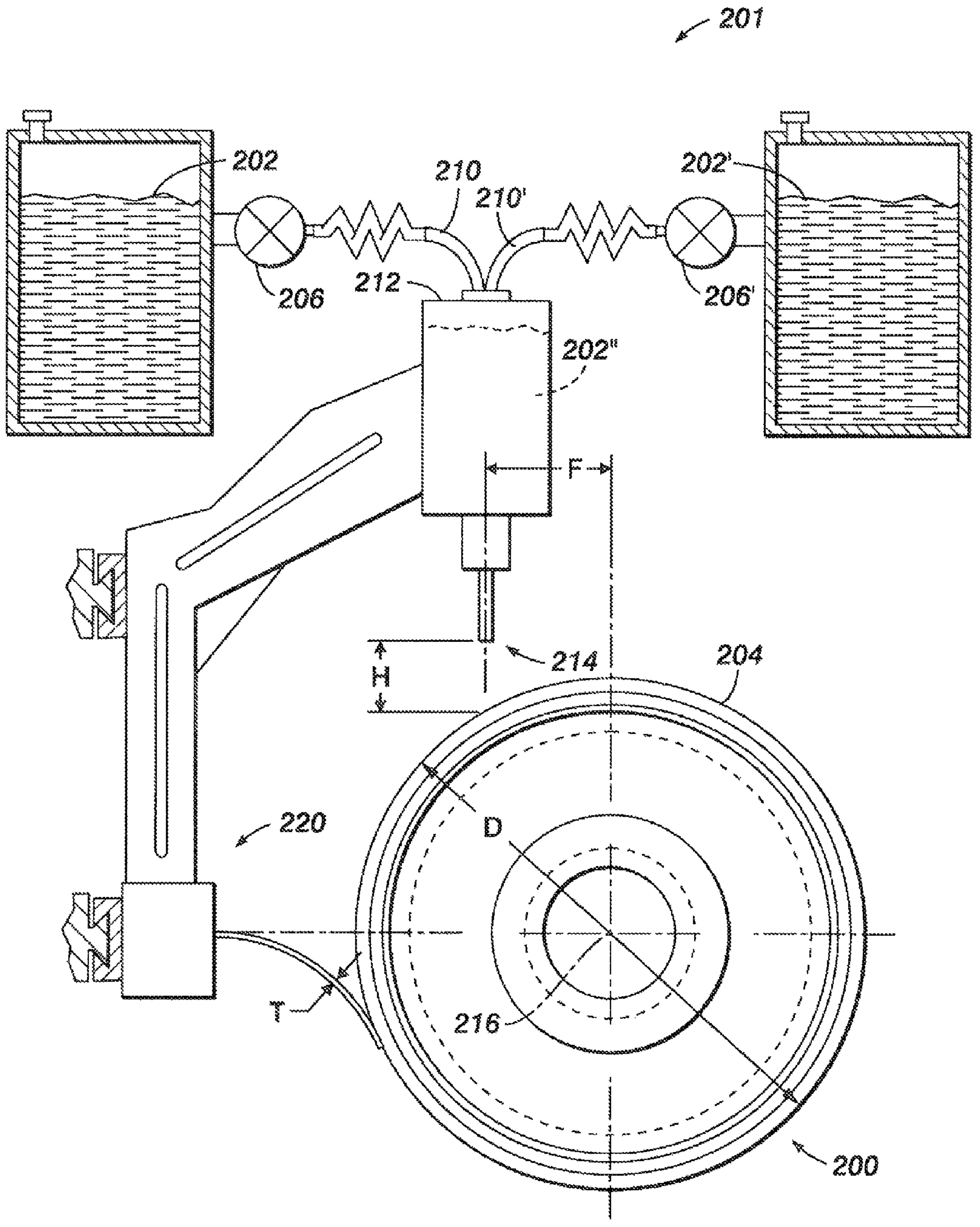
FIG. 2 is an end view of a flow coated fuser member being prepared on a turning apparatus, according to various embodiments of the present teachings.

Referring back to FIG. 2, it shows an end view of a flow coated fuser member 100, 200 being prepared on an apparatus 201. The apparatus 201 can be used to apply the third coating solution 202" to a periphery 204 of the fuser member 200. In some embodiments, the third coating solution 202" can be formed in the applicator 212 by mixing the first coating solution 202 pumped via pump 206 through a conduit typically in the form of a pipe 210 and the second coating solution 202' pumped via pump 206' through a conduit typically in the form of a pipe 210', as shown in FIG. 2. In other embodiments, the third coating solution 202" can be formed in a static mixer (not shown) before being pumped to the applicator 212 by mixing the first coating solution 202 and the second coating solution 202' in the static mixer. The applicator 212 can include a nozzle 214 through which the third coating solution 202" can flow onto the periphery 204 of the fuser member 200.

The third coating solution 202" can be applied to the periphery 204 in a spiral fashion by rotating the fuser member 200 about its longitudinal axis 216 in a horizontal position, as shown by the arrow 270 while translating the applicator 212 in a direction 268 parallel to the longitudinal axis 216 of the fuser member 200 along the length of the substrate 280 in a horizontal position, as shown in FIG. 3. As shown in FIG. 3, the applicator 212 can translate from a first position 264 as shown in solid to a second position 266 as shown in phantom. The applicator 212 can thus travel along with the slide 234 in the direction of arrow 268. The fuser member 200 can be supported in any suitable fashion such as by feed blocks 272 and can be rotated in any suitable fashion such as by driver 274 which can contact the second end cap 254. Furthermore to provide for the driving of the fuser member 200, the fuser member can have a first end cap 252 located at first end 256 and a second end cap 254 located at a second end 258.

By accurately controlling the amount of the third coating solution 202" that can be released at the nozzle 214 of the applicator 212, substantially all of the third coating solution 202" that passes through the nozzle 214 can adhere to the fuser member 200. "Substantially all" as used herein means from about 80 to about 100 percent of the coating initially released from the nozzle will adhere to the fuser member. Furthermore, by changing the ratio of the amounts of the first coating solution 202 and the second coating solution 202' in the third coating solution 202", one can obtain a desired crosslinking agent concentration profile along the longitudinal axis 216.

In various embodiments, using the above described flow coating process, a continuous fluoroelastomer layer 190 having a thickness from about 5 μm to about 250 μm with a tolerance of ±2 μm can be formed over the substrate 180. However, one of ordinary skill in the art would know that subsequent post coating operations, such as, for example, grinding and/or polishing can be required to obtain the preferred dull or flat finish.

Referring back to FIG. 2, when forming the continuous fluoroelastomer layer 190 using the apparatus 201 with an applicator 212 through the nozzle 214, the third coating solution 202" can be applied in a thread-like fashion and can have peaks and valleys on the periphery 204 of the fuser member 200. In some embodiments, a guide 220 can be placed against the periphery 204 of the fuser member 200 as the third coating solution 202" is applied to the fuser member 200 to improve the uniformity of the continuous fluoroelastomer layer 190 over the fuser member 200. U.S. Pat. No. 5,871,832 describes another method, wherein a blade is used at the periphery 204 of the fuser member 200 in order to improve the uniformity of the coating, and U.S. Pat. No. 5,945,223 describes in detail the flow coating process and the apparatus 201, the disclosures of which are incorporated by reference herein in their entirety.

The exemplary fuser member 200 shown in the apparatus 201 is a fuser roll. However, the flow coating process described above can be used to make fuser belts or films. The fuser belts or films can be preferably mounted on a cylindrical mandrill and processed in a manner process similar to that heretofore described, with the outer surface of the belt or film being coated.

Figure 5:
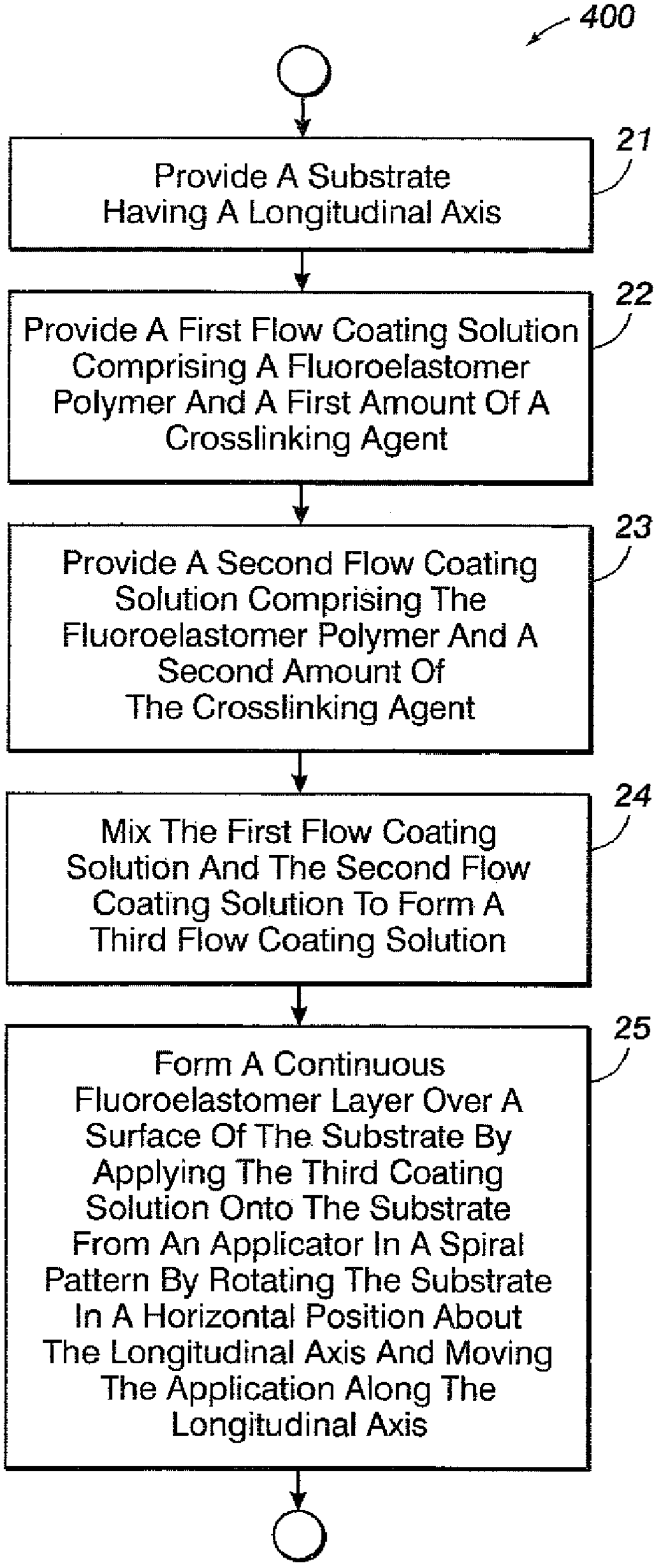
FIG. 5 shows a method of making a fuser member, according to various embodiments of the present teachings.

According to various embodiments, there is a method 400 of making a fuser member 100, 200 as shown in FIG. 5. In various embodiments, an apparatus 201, schematically illustrated in FIGS. 2 and 3 can be used to make the fuser member 100, 200. The method 400 can include providing a substrate 180 having a longitudinal axis 216 as in step 21 and providing a first flow coating solution 202 including a fluoroelastomer polymer and a first amount of a crosslinking agent as in step 22. The method 400 can also include providing a second flow coating solution 202' including a fluoroelastomer polymer and a second amount of a crosslinking agent as in step 23 and mixing the first flow coating solution 202 and the second flow coating solution 202' to form a third flow coating solution 202", as in step 24. In various embodiments, other suitable additives including, but not limited to metal oxides selected from the group consisting of magnesium oxide, cupric oxide, aluminum oxide, and mixtures thereof can be added to one or more of the first coating solution 202, the second coating solution 202', and the third coating solution 202". The method 400 can further include step 25 of forming a continuous fluoroelastomer layer 190 over a surface of the substrate 180 by applying the third flow coating solution 202" onto the substrate 280 from an applicator 212 in a spiral pattern by rotating the substrate 280 in a horizontal position about the longitudinal axis 216 and moving the applicator 212 along the longitudinal axis 212, wherein the crosslinking agent concentration can be varied along the longitudinal axis 216 by changing the ratio of the first flow coating solution 202 and the second flow coating solution 202' in the third flow coating solution 202". In various embodiments, the step 25 of forming a continuous fluoroelastomer layer 190 over a surface of the substrate 180, 280 can include forming a stain resistance region 191 and forming one or more wear resistance regions 192, as shown in FIGS. 1A and 1B. In some embodiments, the method 400 can also include curing the continuous fluoroelastomer layer 190, such that the crosslinking agent to fluoroelastomer polymer ratio can be from about 0.03 to about 0.04 in the wear resistance region 192 after curing. In other embodiments, the method 400 can further include curing the continuous fluoroelastomer layer 190, such that the crosslinking agent to fluoroelastomer polymer ratio is from about 0.09 to about 0.1 in the stain resistant region 191 after curing.

Figure 6:
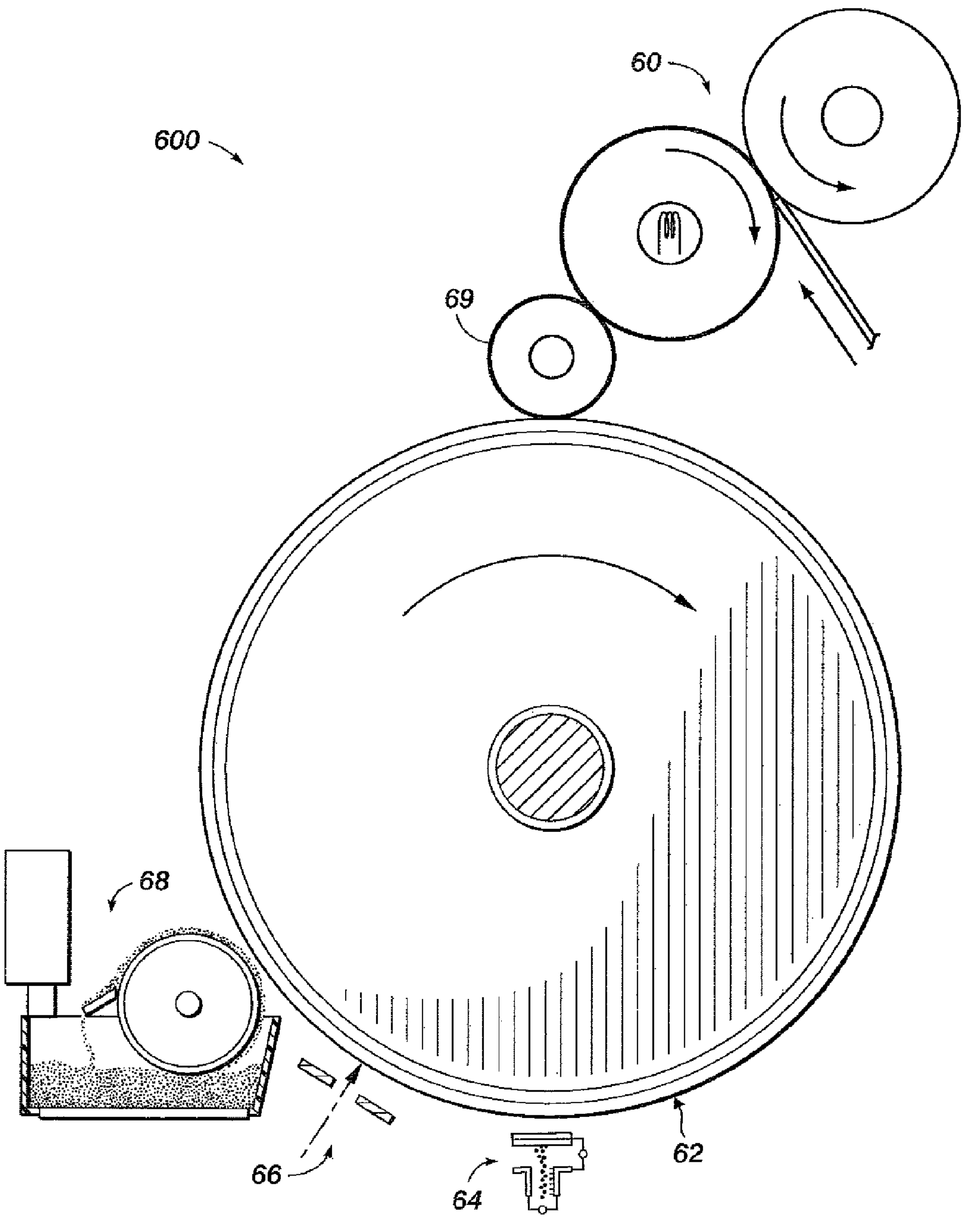
FIG. 6 shows an exemplary image forming apparatus, according to various embodiments of the present teachings.

According to various embodiments, there is an image forming apparatus 600 as shown in FIG. 6. The image forming apparatus 600 can include a receptor 62 to receive an electrostatic latent image, at least one charging component 64 for uniformly charging the receptor 62, and at least one imaging component 66 to form a latent image on the receptor 62. The image forming apparatus 600 can also include at least one development component 68 for converting the latent image to a visible image on the receptor 62 and a transfer component 69 for transferring the visible image onto a media. The image forming apparatus 600 can further include a fuser member 60, 100 as shown in detail FIGS. 1A and 1B for fusing the visible image onto the media. The fuser member 100 can include a substrate 180 having a first edge 181 and a second edge 182 and a continuous fluoroelastomer layer 190 disposed over a surface of the substrate 180, the continuous fluoroelastomer layer 190 can include a first region 191 having a first crosslink density and at least a second region 192 having a second crosslink density, wherein the first region 191 can be disposed at an interior portion relative to the first 181 and second 182 edges of the substrate 180 and the at least second region 192 can be disposed proximate to the first region 191. In various embodiments, the first region 191 can include a stain resistant region having the first crosslink density and the at least second region 192 can include one or more wear resistant regions having the second crosslink density lower than the first crosslink density. In some embodiments, at least one of the one or more wear resistant regions can be disposed at a position to reduce wear from edges of the media.

Examples are set forth hereinbelow and are illustrative of different amounts and types of reactants and reaction conditions that can be utilized in practicing the disclosure. It will be apparent, however, that the disclosure can be practiced with other amounts and types of reactants and reaction conditions than those used in the examples, and the resulting devices various different properties and uses in accordance with the disclosure above and as pointed out hereinafter.

EXAMPLES

Prophetic Example 1

Preparation of First Flow Coating Solution Without Curative (Part A)

About 60 grams of VITON GF®, a terpolymer of vinylidene fluoride, hexafluoropropylene and tetrafluoroethylene (DuPont, Wilmington, Del.) and about 197.8 grams of methyl isobutyl ketone are stirred at ambient temperature of about 25° C. using a Union Process O1 attritor (Union Process, Inc., Akron, Ohio) containing about 2,500 grams of about ⅜ inch steel shots for about 30 minutes to form a polymer solution. The attritor is externally cooled with a water jacket to maintain the solution temperature at about 25° C. Without external cooling, the temperature of the solution in the attritor can rise to about 33° C. The resultant mixture is then filtered through about ⅛ inch coarse nylon filter cloth.

Prophetic Example 2

Preparation of Second Flow Coating Solution With Curative (Part B)

A mixture of about 1.2 grams (about 0.407 weight %) of magnesium hydroxide (Merck and Company, MAGLITE D™), about 0.6 gram (about 0.203 weight %) of calcium hydroxide (Baker reagent grade), and about 3.5 grams of VITON CURATIVE 50® (DuPont) and about 100 grams of methyl isobutyl ketone are stirred at ambient temperature of about 25° C. using a Union Process O1 attritor containing about 2,500 grams of about ⅜ inch steel shots for 30 minutes to form a curative solution.

Prophetic Example 3

Fabrication of a Fuser Roll

Mix the first flow coating solution (Part A) of Prophetic example 1 with the second flow coating solution (Part B) of Prophetic example 2 at the flow coating head to form a third flow coating solution. Apply the third flow coating solution onto a metal roll, such that the VITON CURATIVE 50® concentration in the coating varies from about 4-5 weight % in the wear resistance region (low cure zone) to about 5-7 weight % in the stain resistant region (high cure zone). The coated metal roll is then thermally cured for about 4 hours at about 45° C., about 2 hours at about 75° C., about 16 hours at about 95° C., followed by ramp heating to about 400° C. for about 16 hours.

Prophetic Example 4

Preparation of First Coating Solution (Part C)

About 60 grams of VITON GF®, a terpolymer of vinylidene fluoride, hexafluoropropylene and tetrafluoroethylene (DuPont) and about 197.8 grams of methyl isobutyl ketone are stirred at ambient temperature of about 25° C. using a Union Process O1 attritor containing about 2,500 grams of about ⅜ inch steel shots for about 30 minutes to form a polymer solution. The attritor is externally cooled with a water jacket to maintain the solution temperature at about 25° C. Without external cooling, the temperature of the solution in the attritor can rise to about 33° C. A mixture of about 1.2 grams (about 0.407 weight %) of magnesium hydroxide (Merck and Company, MAGLITE D™), about 0.6 gram (about 0.203 weight %) of calcium hydroxide (Baker reagent grade), and about 3.5 grams of VITON CURATIVE 50® (DuPont) are added and stirring is continued for about 15 more minutes. About 23.62 grams (about 8 weight %) of methanol is then added, and stirring is continued for 15 additional minutes. The resultant mixture is then filtered through ⅛ inch coarse nylon filter cloth.

Example 5

Preparation of First Coating Solution (Part D)

About 60 grams of VITON GF®, a terpolymer of vinylidene fluoride, hexafluoropropylene and tetrafluoroethylene (DuPont, Wilmington, Del.) and about 197.8 grams of methyl isobutyl ketone are stirred at ambient temperature of about 25° C. using a Union Process O1 attritor containing about 2,500 grams of about ⅜ inch steel shots for 30 minutes to form a polymer solution. The attritor is externally cooled with a water jacket to maintain the solution temperature at about 25° C. Without external cooling, the temperature of the solution in the attritor can rise to about 33° C. A mixture of about 1.2 grams (about 0.407 weight %) of magnesium hydroxide (Merck and Company, MAGLITE D™), about 0.6 gram (about 0.203 weight %) of calcium hydroxide (Baker reagent grade), and about 2.7 grams of VITON CURATIVE 50® (DuPont) are added and stirring is continued for about 15 more minutes. About 23.62 grams (about 8 weight %) of methanol is then added, and stirring is continued for about 15 additional minutes. The resultant mixture is then filtered through about ⅛ inch coarse nylon filter cloth.

Prophetic Example 6

Fabrication of a Fuser Rolls

Mix the first flow coating solution (Part C) of Prophetic Example 4 with the second flow coating solution (Part D) of Prophetic Example 5 at the flow coating head to form a third flow coating solution. Apply the third flow coating solution onto a metal roll, such that the VITON CURATIVE 50® concentration in the coating varies from about 4-5 weight % in the wear resistance region (low cure zone) to about 5-7 weight % in the stain resistant region (high cure zone). The coated metal roll is then thermally cured for about 4 hours at about 45° C., about 2 hours at about 75° C., about 16 hours at about 95° C., followed by ramp heating to about 400° C. for about 16 hours.

While the invention has been illustrated respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fuser member configured for fusing images onto a media in electrostatographic fixing systems, the fuser member comprising:

a substrate having a first edge and a second edge; and a continuous fluoroelastomer layer disposed over a surface of the substrate, the continuous fluoroelastomer layer comprising a first region having a first crosslink density and at least a second region having a second crosslink density, wherein the first region is disposed at an interior portion relative to the first and second edges of the substrate and the at least second region is disposed proximate to the first region, and wherein the second crosslink density is lower than the first crosslink density, wherein the fuser member is configured for fusing the images onto the media.

2. The fuser member of claim 1, wherein the first region comprises a stain resistant region having the first crosslink density and the at least second region comprises one or more wear resistant regions having the second crosslink density lower than the first crosslink density.

3. The fuser member of claim 2, wherein at least one of the one or more wear resistant regions is disposed at a position to reduce wear from edges of a media.

4. The fuser member of claim 1, wherein the continuous fluoroelastomer layer comprises fluoroelastomer polymer selected from the group consisting of copolymers of vinylidene fluoride, hexafluoropropylene, and tetrafluorothylene; and terpolymers of vinylidene fluoride, hexafluoropropylene, and tetrafluorothylene.

5. An image forming apparatus comprising:

a receptor to receive an electrostatic latent image;

at least one charging component for uniformly charging the receptor;

at least one imaging component to form a latent image on the receptor;

at least one development component for converting the latent image to a visible image on the receptor;

a transfer component for transferring the visible image onto a media; and a fuser member for fusing the visible image onto the media, wherein the fuser member comprises:

a substrate having a first edge and a second edge; and a continuous fluoroelastomer layer disposed over a surface of the substrate, the continuous fluoroelastomer layer comprising a first region having a first crosslink density and at least a second region having a second crosslink density, wherein the first region is disposed at an interior portion relative to the first and second edges of the substrate and the at least second region is disposed proximate to the first region, and wherein the second crosslink density is lower than the first crosslink density.

6. The image forming apparatus of claim 5, wherein the first region comprises a stain resistant region having the first crosslink density and the at least second region comprises one or more wear resistant regions having the second crosslink density lower than the first crosslink density.

7. The image forming apparatus of claim 6, wherein at least one of the one or more wear resistant regions is disposed at a position to reduce wear from edges of the media.

8. The image forming apparatus of claim 5, wherein the continuous fluoroelastomer layer comprises fluoroelastomer polymer selected from the group consisting of copolymers of vinylidene fluoride, hexafluoropropylene, and tetrafluorothylene; and terpolymers of vinylidene fluoride, hexafluoropropylene, and tetrafluorothylene.

* * * * *